United States Patent
Krause et al.

(10) Patent No.: US 11,126,013 B2
(45) Date of Patent: Sep. 21, 2021

(54) SPECTACLE LENS AND METHOD FOR CALCULATING AND PRODUCING A SPECTACLE LENS

(71) Applicant: Carl Zeiss Vision International GmbH, Aalen (DE)

(72) Inventors: Michael Krause, Ulm (DE); Thomas Glöge, Schorndorf (DE); Christian Lappe, Mutlangen (DE); Timo Kratzer, Aalen (DE); Siegfried Wahl, Donzdorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 505 days.

(21) Appl. No.: 16/183,446

(22) Filed: Nov. 7, 2018

(65) Prior Publication Data

US 2019/0072786 A1 Mar. 7, 2019

Related U.S. Application Data

(63) Continuation of application No. PCT/EP2017/061833, filed on May 17, 2017.

(30) Foreign Application Priority Data

May 17, 2016 (EP) ..................................... 16169966

(51) Int. Cl.
*G02C 7/10* (2006.01)
*G02B 5/28* (2006.01)
(Continued)

(52) U.S. Cl.
CPC .............. *G02C 7/104* (2013.01); *G02B 1/115* (2013.01); *G02B 5/22* (2013.01); *G02B 5/283* (2013.01); *G02C 2202/24* (2013.01)

(58) Field of Classification Search
CPC .... G02C 7/104; G02C 2202/24; G02B 5/283; G02B 1/115; G02B 5/22
See application file for complete search history.

(56) References Cited

U.S. PATENT DOCUMENTS

3,936,579 A 2/1976 Ogasawara et al.
4,300,821 A 11/1981 Mignen
(Continued)

FOREIGN PATENT DOCUMENTS

CN 103885100 A 6/2014
CN 104321687 A 1/2015
(Continued)

OTHER PUBLICATIONS

Kraats et al. "Optical density of the aging human ocular media in the visible and the UV," Journal of the Optical Society of America, vol. 24, Nr. 7, pp. 1842-1857, Jul. 1, 2007.
(Continued)

*Primary Examiner* — James C. Jones
(74) *Attorney, Agent, or Firm* — Thrive IP®; Georg Hasselmann

(57) ABSTRACT

A spectacle lens has an object-side front surface and an eye-side rear surface and is made of a base material that includes an ultraviolet (UV) absorber, which functions as a band-stop filter for UV light. In a first variant, the band-stop filter has an upper cut-off wavelength between 325 nm and 360 with a transmittance of 2% for light which is incident on the front surface, transmitted through the spectacle lens, and emerges from the rear surface for each angle of incidence between 0° and 15°. Additionally or alternatively, in a second variant, the spectacle lens has an antireflective coating with a reflectance below 5% for UV light in a wavelength range between 280 nm and a threshold wavelength, which lies between 325 nm and 350 nm, and a reflectance of
(Continued)

5% at the threshold wavelength for each angle of incidence between 30° and 45°.

18 Claims, 7 Drawing Sheets

(51) Int. Cl.
*G02B 1/115* (2015.01)
*G02B 5/22* (2006.01)

(56) References Cited

U.S. PATENT DOCUMENTS

| | | | |
|---|---|---|---|
| 5,959,761 | A | 9/1999 | Perrott et al. |
| 6,103,148 | A | 8/2000 | Su et al. |
| 6,156,242 | A | 12/2000 | Saito et al. |
| 6,852,406 | B2 | 2/2005 | Marechal et al. |
| 6,863,397 | B2 | 3/2005 | Nakano |
| 8,425,035 | B2 | 4/2013 | von Blanckenhagen |
| 8,591,026 | B2 | 11/2013 | Conte et al. |
| 8,870,374 | B2 | 10/2014 | Cado et al. |
| 10,133,092 | B2 | 11/2018 | Tsubota et al. |
| 10,330,953 | B2 | 6/2019 | De Ayguavives et al. |
| 10,649,232 | B2 | 5/2020 | Cado et al. |
| 2017/0168320 | A1 | 6/2017 | Tsubota et al. |
| 2020/0050019 | A1* | 2/2020 | Jiang ............... B29D 11/0073 |

FOREIGN PATENT DOCUMENTS

| | | |
|---|---|---|
| CN | 104730728 A | 6/2015 |
| DE | 3007572 C2 | 12/1982 |
| DE | 69534779 T2 | 7/2006 |
| DE | 102008041869 A1 | 3/2010 |
| EP | 0955147 A1 | 11/1999 |
| EP | 1174734 A2 | 1/2002 |
| EP | 2692941 A1 | 2/2014 |
| EP | 3153139 A1 | 4/2017 |
| JP | 2006126233 A | 5/2006 |
| JP | 2008191186 A | 8/2008 |
| WO | 0155752 A1 | 8/2001 |
| WO | 03023497 A1 | 3/2003 |
| WO | 2010109154 A1 | 9/2010 |
| WO | 2010125667 A1 | 11/2010 |
| WO | 2015186723 A1 | 12/2015 |

OTHER PUBLICATIONS

Cooper et al.: "The Yellow Colour of the Lens of Man and Other Primates," J. Physiol., vol. 203, pp. 411-417, Jan. 1, 1969.
Sherwin et al.: "The Association between Time Spent Outdoors and Myopia Using a Novel Biomarker of Outdoor Light Exposure", Investigative Ophthalmology & Visual Science, vol. 53, pp. 4363-4370, Jul. 2012.
Torii et al.: "Violet Light Exposure Can Be a Preventive Strategy Against Myopia Progression," EBioMedicine 15, pp. 210-219, 2017.
Schaeffel et al. "Inhibiting Myopia by (Nearly) Invisible Light?" EBioMedicine 16, pp. 27-28, 2017.
Ophthalmic optics—Spectacle lenses—Vocabulary (ISO 13666:2012); German and English version EN ISO 13666:2012, Oct. 2013.
International Search Report and English-language translation thereof issued in PCT/EP2017/061833, to which this application claims priority, dated Aug. 24, 2017.
International Preliminary Report on Patentability issued in PCT/EP2017/061833, to which this application claims priority, dated Aug. 14, 2018.
Office action by the Chinese patent office issued in CN 201780030384.3 dated Aug. 27, 2019 and English-language machine translation thereof.
Office action by the Chinese patent office issued in CN 201780030384.3 dated Mar. 24, 2020 and English-language machine translation thereof.

\* cited by examiner

SPECTACLE LENS AND METHOD FOR CALCULATING AND PRODUCING A SPECTACLE LENS

CROSS REFERENCE TO RELATED APPLICATIONS

This application is a continuation application of international application PCT/EP2017/061833, filed May 17, 2017, which claims priority to European patent application EP 16169966.5, filed on May 17, 2016, both of which are hereby incorporated by reference in their entireties.

TECHNICAL FIELD

The disclosure relates to a spectacle lens, a computer-implemented method for calculating a spectacle lens, a method for producing a spectacle lens, and a computer program for calculating a spectacle lens. Further, the use of a spectacle lens for controlling the longitudinal growth of the eye in the case of adolescents with myopia progression or a corresponding method for controlling the longitudinal growth is disclosed.

BACKGROUND

Spectacle lenses are known in many variations from the related art. There are spectacle lenses without nominal dioptric power and correction spectacle lenses, that is to say spectacle lenses having dioptric power. Dioptric power is the collective term for the focusing and the prismatic power of a spectacle lens.

In the case of correction spectacle lenses, a distinction is drawn between single-vision spectacle lenses and multifocal spectacle lenses. A single-vision spectacle lens is a spectacle lens in which only one dioptric power is present in respect of the design. A multifocal spectacle lens is a spectacle lens in which two or more visibly different parts having different focusing powers are present in respect of the design. Importance is attached in particular to bifocal spectacle lenses, namely multifocal spectacle lenses comprising two parts, usually for distance vision and near vision, and to progressive spectacle lenses, namely spectacle lenses comprising at least one progressive surface and an increasing (positive) power when the wearer of the spectacles looks down. Degressive spectacle lenses, i.e., spectacle lenses comprising at least one progressive surface and a decreasing power (i.e., an attenuation of the power) when the wearer of the spectacles looks down, are uncommon.

What form must be obtained by the spectacle lens to obtain the desired optical correction is decisively determined by the material thereof. Here, the most important parameter is the refractive index of the material. While spectacle lenses were predominantly produced from mineral glasses in the past, in particular crown glasses (Abbe number>55) and flint glasses (Abbe number<50), spectacle lenses from a multiplicity of organic materials have become available in the meantime. Such base materials for organic spectacle lenses are offered, inter alia, under the trade names CR 39, MR 8, MR 7, CR 330 and MR 174. A selection of such base materials is also found in the published specification EP 2692941 A1. Other materials are continuously being tested and developed in respect of the suitability thereof for organic spectacle lenses. Table 1, below, elucidates typical variables and reference variables of a selection of known base materials:

TABLE 1

Base materials for the production of spectacle lenses

| Trade name | Base material | Average refractive index $n_e$ | Abbe number $v_e$ |
| --- | --- | --- | --- |
| CR 39 | Poly allyl diglycol carbonate | 1.500 | 56 |
| CR 330 | | | |
| CR 607 | | | |
| CR 630 | | | |
| Trivex | Polyurea/ Polyurethane | 1.530 | 45 |
| PC | Polycarbonate | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepi sulfi de | 1.738 | 32 |
| | Mineral 1.5 | 1.525 | 58 |
| | Mineral 1.6 | 1.604 | 44 |

Currently, a large number of organic spectacle lens semi-finished products or finished products with spherical, rotationally symmetric aspherical, or progressive front surfaces are cast in mass production in prototypes with front and back surface form shells, which are spaced apart from one another by means of a sealing ring, forming a cavity in the process, as described in, e.g., the documents DE 3007572 C2, U.S. Pat. No. 6,103,148 A or JP 2008 191186 A. This applies to base materials with the trade names MR 7, MR 8, MR 10 and CR 39, CR 607, CR 630, etc. The base materials with the trade names MR 7, MR 8, and MR 10 are polythiourethanes marketed by Mitsui Chemicals. The abbreviation "MR" here stands for Mitsui Resin. CR 39 or Columbia Resin 39 is the brand name selected by Pittsburgh Plate Glass Industries (PPG Industries) under which the material poly diethylene glycol bis allyl carbonate or poly allyl diglycol carbonate (abbreviation: PADC) is marketed. This is a highly-refractive thermosetting polymer material. CR 607 and CR 630 are also produced by PPG. The materials CR 607 and CR 630 are used for example for photochromic applications.

While UV-C radiation having wavelengths of between 100 nm and 280 nm is almost completely absorbed by Earth's atmosphere, UV-B radiation having wavelengths of between 280 nm and 315 nm and UV-A radiation at 315 nm to 380 nm reach the human eye.

Since electromagnetic radiation between 280 nm and 400 nm firstly is deemed to have a harmful effect on the eye and secondly can lead to the degradation of base materials composed, in particular, of organic plastics, so-called UV absorbers are added not only to the base materials of spectacle lenses for sunglasses, but generally also to the base materials of untinted spectacle lenses, as is described, e.g., in the documents EP 1174734 A2 or U.S. Pat. No. 8,870,374 B2. The UV absorbers can be added to the base materials before or during the casting process for the spectacle lens. However, it is also possible for the cast and cured spectacle lenses subsequently to be "colored" with corresponding UV absorbers. All these variants are referred to hereinafter as base material with UV absorber.

The primary function of the UV absorbers used in the case of clear, i.e., untinted, spectacle lenses resides in the protection of the base material against long-term UV degradation. Therefore, UV absorbers of this type are also referred to as UV stabilizers. Depending on the base material to be protected, the functional use duration sought for the spectacle lens and the sensitivity of the base material vis à vis UV degradation, different UV stabilizers are used. UV stabilizers, such as, e.g., benzophenones, are based on preventing the formation of free radicals by absorbing the UV radiation that causes the formation of free radicals. The mass fractions of UV absorbers of this type in the base material are generally between 0.05% by weight and 2% by weight, in some applications even up to 5% by weight.

The choice of the suitable UV absorber, which has to be compatible with the base material and the processing conditions, and the optimization of the concentration for achieving a desired UV absorption property can be determined, e.g., with the aid of simulation programs taking account of suitable material databases. One simulation program of this type is offered by X-Rite, e.g., under the designation "Plastic Colour Master." Details are described under the URL color.xrite.com/de-de/color-measurement-quote?utm_source=google&utm_medium=cpc&utm_campaign=01-GO-DE-DE-Brand_P&utm_content=Brand&utm_term=x+rite.

DE 69534779 T2 reveals a selection of suitable UV absorbers for spectacle lenses. It specifies that UV absorbers can be selected from one or more of the group consisting of benzotriazoles, benzophenols, and cyanoacrylates. The document furthermore reveals that UV absorbers can be selected in particular from one or more of the following substances:

BASF Tinuvin P—[2(2'-hydroxy-5'-methylphenyl)benzotriazole],
Cyanamid Cyasorb UV 531—[2-hydroxy-4-n-acetoxybenzophenone],
Cyanamid Cyasorb UV 5411-[2-(2'-hydroxy-5-octylphenyl) benzotriazole],
2-(2'-hydroxy-3',6'(1,1-dimethylbenzylphenyl)benzotriazole,
2-(2'-hydroxy-3',5'-di-t-amylphenyl)benzotriazole,
bis[2-hydroxy-5-methyl-3-(benzotriazol-2-yl)phenyl]methane,
bis[2-hydroxy-5-t-octyl-3(benzotriazol-2-yl)phenyl]methane,
Cyanamid UV 2098—[2-hydroxy-4-(2-acrylocyloxyethoxybenzophenone],
National S&C Permasorb MA—[2-hydroxy-4-(2-hydroxy-3-methacryloxy)propoxy-benzophenone],
Cyanamid UV 24—[2,2'-dihydroxy-4-methoxybenzophenone],
BASF Uvinul 400—[2,4-dihydroxybenzophenone],
BASF Uvinul D49—[2,2'-dihydroxy-4,4-dimethoxybenzophenone],
BASF Uvinul D50—[2,2',4,4'-tetrahydroxybenzophenone],
BASF Uvinul D35—[ethyl-2-cyano-3,3-diphenyl acrylate],
BASF Uvinul N-539—[2-ethexyl-2-cyano-3,3-diphenyl acrylate],
BASF Tinuvin 213,
2',2',4-trihydroxybenzophenone,
BASF Uvinul M493™ and commercially available mixtures thereof,
2-hydroxy-4-acryloyloxyethoxybenzophenone (polymer),
2-hydroxy-4-acryloyloxyethoxybenzophenone,
4-hydroxy-4-methoxybenzophenone, and
2-hydroxy-4-n-octoxybenzophenone.

Semifinished products or finished products for spectacle lenses made out of polycarbonate are generally produced in metal forms by means of an injection molding technique. This production method is described in, e.g., EP 0955147 A1.

Mineral spectacle lenses are generally produced by machine-based mechanically abrasive machining of a blank.

The semifinished products or finished products described above are often subjected to one or more finishing processes. In particular, functional layers are applied to one or both sides. Such functional layers are layers which equip the spectacle lenses with predetermined properties, which are advantageous to the spectacle wearer and which the spectacle lenses would not have purely on the basis of the properties of the base or carrier material, onto which the functional layers are applied where necessary, and the forming. In addition to optical properties, such as an antireflection coating, silvering, light polarization, coloring, self-tinting, etc., such advantageous properties also include mechanical properties, such as hardening, reduction of the adherence of dirt or reduction in steaming up, etc., and/or electrical properties, such as shielding from electromagnetic radiation, conduction of electrical current, etc., and/or other physical or chemical properties. Examples of functional coatings are gathered, e.g., from the documents WO 10/109154 A1, WO 01/55752 A1, and DE 10 2008 041 869 A1.

Antireflection coatings, which synonymously are also called antireflective coatings, are of particular importance with regard to the present disclosure. Antireflection coatings are used to suppress the reflection of spectacle lenses and to increase the transmission. The reduction of the reflectance at the improved surface is achieved by destructive interference of the reflected rays. The reflection can be reduced further and over a wider wavelength and angular range by the use of a plurality of layers having different refractive indices. There is no simple formula for the optimum layer thickness for a given choice of materials. These parameters are therefore determined with the aid of simulation programs. One simulation program of this type is, e.g., by OptiLayer GmbH in Garching, Germany. Distributors can be found at the URL www.optilayer.com/distributors.

Typical materials for coatings of this type are metal oxides, metal fluorides, metal nitrides, diamondlike carbon, or combinations thereof. Appropriate metal oxides are, e.g., one or more compounds of the group including chromium dioxide, aluminum oxide, titanium dioxide, indium tin oxide (ITO), zirconium dioxide, silicon dioxide, or combinations thereof.

Antireflection coatings are produced by coating methods of thin film technology. The most frequently used methods include physical vapor deposition, such as thermal evaporation and cathode sputtering. The choice of coating method is typically dependent on the desired layer material; by way of example, there are materials which are not suitable for thermal evaporation.

Order-specific prescription spectacle lenses, in particular, individualized single vision and multi-focal lenses, the optical properties of which are not standardized in a preselectable manner, at least in part, but rather are individually calculated and manufactured in a manner adapted to the user in relation to the dimensions and/or the arrangement thereof on the spectacle lens, and, in particular, varifocal or progressive lenses are brought into their final form by mechanical, in particular deforming and/or abrasive, methods. Here, the outer forms may have a round, oval, or arbitrary shape, describing so-called freeforms in the latter case.

Stephen B. Prepas, in a publication in Medical Hypotheses (2008) 70, 635 to 637 entitled "Light, literacy and the absence of ultraviolet radiation in the development of myopia," which is retrievable at the URL intl.elsevierhealth.com/journals/mehy, has expressed the conjecture that the absence of UV light in the wavelength range between 200 nm and 400 nm might bring about longitudinal growth of the eyeball that causes myopia.

SUMMARY

It is an object of the disclosure to provide a spectacle lens, a method for calculating a spectacle lens, and the corresponding computer program in respect thereof and a method for producing a spectacle lens which take account of the conjecture expressed by Stephen B. Prepas.

This object is achieved with a spectacle lens having an angular-dependent reflectance, a computer-implemented method for calculating a spectacle lens having an angular-dependent reflectance, a method for producing a spectacle lens having an angular-dependent reflectance, a computer program for calculating a spectacle lens having an angular-dependent reflectance, as well as a process and a method for controlling the longitudinal growth of the eye in the case of adolescents with myopia progression, as disclosed herein.

Exemplary embodiments of the disclosure are likewise discussed below.

The inventors undertook intensive literature studies to achieve this object. They established that the spectral weighting function $W(\lambda)=E_S(\lambda)S(\lambda)$, this function being indicated in Table A.1 of DIN EN ISO 13666:2013-10 and resulting from the product of solar irradiance $E_S(\lambda)$ and relative spectral effectiveness function $S(\lambda)$, for calculating the UV transmittance has an absolute maximum at a wavelength $\lambda$, of 310 nm and a relative maximum at a wavelength $\lambda$, of 335 nm.

The blue light hazard function $B(\lambda)$, which is likewise indicated in Table A.1 of DIN EN ISO 13666:2013-10, has an absolute and relative maximum at a wavelength $\lambda$, of between 435 nm and 440 nm. From the product of solar irradiance $E_S(\lambda)$ and blue light hazard function $B(\lambda)$, the resulting spectral weighting function $W_B(\lambda)=E_S(\lambda) \cdot B(\lambda)$ for calculating the blue transmittance has an absolute and relative maximum at a wavelength $\lambda$ of 450 nm.

The spectral weighting function $W(\lambda)$ relevant to UV light, which can be gathered from Table A.1 of DIN EN ISO 13666:2013-10, has comparatively small values for wavelengths $\lambda$ of between 355 nm and 380 nm. The same applies to blue light hazard and weighting functions $B(\lambda)$ and $W_B(\lambda)$, relevant to blue light, for wavelengths in the range of between 380 nm and 390 nm. The inventors have recognized that the wavelength range between 355 nm and 390 nm of natural solar radiation has a comparatively low hazard potential for the human eye. However, the natural ultraviolet radiation intensity particularly in the wavelength range between 305 nm and 325 nm has an effect comparatively hazardous to the health of the human eye. It can be deduced from this and verified by studies that the wavelength range of natural solar radiation between 355 nm and 390 nm is necessary for controlling the longitudinal growth of the eye particularly in the case of adolescents. Accordingly, in the inventors' opinion the progression of defective vision (in particular short-sightedness) could be delayed if more light of these wavelengths reached the eye.

Most materials currently used for producing spectacle lenses absorb light in the wavelength range around 380 nm practically completely; mineral glasses and a polymer having a refractive index of 1.50 being exceptions.

The inventors established that clear spectacle lenses composed of mineral glass, forming the first exception indicated above, are produced and sold without UV absorbers, in principle, owing to the absent risk of UV degradation. Generally, only sunglasses composed of mineral glass have a UV absorber in the base material. The UV absorber content in sunglasses is so high, however, that the latter almost completely absorb light in the wavelength range between 355 nm and 390 nm.

The second exception mentioned above concerns the plastic poly diallyl diglycol carbonate or (P)ADC, which is sold inter alia by PPG under the tradenames CR39, CR607, and the like or by Acomon as RAV700, 713, 717, and the like. In the case of this base material, the production process with a free radical initiator inevitably leads to the so-called UV cut-off being shifted into the UV range, often to 350 nm. It has to be kept in mind here that at the start of the reaction the initiator forms free radicals that decompose the UV absorber molecules and thus render them unsuitable for further use. Accordingly, and unlike in the case of the other typical materials for spectacle lenses, they are not even added in the first place or are introduced into the substrate material only to a very small extent. A UV protection extending beyond a UV cut-off of 350 nm can be introduced into the cured product only afterwards. In the context of the present disclosure, the UV cut-off is defined as the upper cut-off wavelength of the band-stop filter effect of the spectacle lens for ultraviolet light, at which the transmittance of the light that is incident on a spectacle lens surface at an angle of incidence, is transmitted through the spectacle lens and emergent from the opposite spectacle lens surface relative to the spectacle lens surface of incidence is 2%. The transmittance $T(\lambda)$ describes that proportion of the incident luminous flux which completely penetrates through the spectacle lens. The term angle of incidence of a light ray passing through an optical interface (here: the spectacle lens surface) denotes the angle with respect to the normal perpendicular to the optical interface.

Accordingly, apart from the exceptions described above, namely if the base material of the spectacle lens is the material PADC with UV absorber addition to a small extent or the material mineral glass without UV absorbers, the portion of the light beneficial for controlling the longitudinal growth of the eye which can reach the eye is accordingly vanishingly low in the case of conventional spectacle lenses. Thus, wearing spectacles leads to a counterproductive effect that increases more and more the shielding of the eye from required radiation and thus encourages the longitudinal growth. What is more, with increasing myopia, the spectacle lens becomes thicker and thicker, which further amplifies the shielding of helpful radiation. Affected persons with myopia progression and thus children, in particular, are caught in a vicious circle.

Some products, on account of their specific coating, offer so-called spectacle lens back side UV protection (see, e.g., Essilor Crizal UV), which minimizes that proportion of the UV light which is reflected from the back side of the spectacle lens into the eye of the wearer of spectacles when the UV light is incident obliquely. This mode of operation is described, e.g., at the URL www.essilor.de/brillenglaser/veredelungen/Seiten/CrizalUV.aspx. As a result, the beneficial UV light that delays the progress of defective vision (in particular short-sightedness) cannot reach the eye of the wearer of spectacles either by transmission through the spectacle lens from the front or by reflection at the back side of the lens.

The fundamental concept of the inventors is, then, to configure (i) the base material, from which the spectacle lens is formed, with the UV absorber and/or (ii) the coating, in particular an (antireflection) coating comprising a plurality of dielectric layers and acting on the principle of constructive and destructive interference, such that more beneficial UV light that delays the progress of short-sightedness reaches the eye of the wearer of spectacles.

In order to realize the first variant (i), the disclosure provides a spectacle lens having the following properties:

The spectacle lens has (during use as intended) an object-side front surface and an eye-side back surface. The spectacle lens is based on a base material with a mass fraction that differs from zero of a UV absorber that brings about a band-stop filter effect for ultraviolet light that is incident on the front surface at an angle of incidence, transmitted through the spectacle lens and emergent from the back surface.

The base material can be any material suitable for producing spectacle lenses. In particular, the base material can be one or more of the materials mentioned above in the introductory part of the description, namely in particular mineral glass, polyurea, polyacrylates, polyurethane, polycarbonate, polythiourethane, and polyepisulfide. In the context of the first variant (i) of the present disclosure, the use of poly allyl diglycol carbonate as base material is excluded because, owing to the requirements of production, it usually already has the properties described in the context of the disclosure. However, materials considered in particular for use as base material are all materials that satisfy the optical requirements of a spectacle lens and have a refractive index of more than 1.50, in particular a refractive index of more than 1.52, more particularly a refractive index of more than 1.55, and even more particularly a refractive index of more than 1.6.

As UV absorber, it is possible to use all those materials which are compatible with the base material and the processing conditions and which have the desired UV absorption properties described below. In particular, it is also possible for the base material not just to be admixed with a single UV absorber material, but rather for the UV absorber to comprise a plurality of different chemical compounds that absorb ultraviolet light. In principle, as UV absorber materials, consideration is given to chemical compounds from the group of benzotriazoles, benzophenols, benzophenones, and cyanoacrylates. By way of example, the following compounds and mixtures thereof are suitable as UV absorbers: 2(2'-hydroxy-5'-methylphenyl)benzotriazole, 2-hydroxy-4-n-acetoxybenzophenone, 2-(2'-hydroxy-5-5-octylphenyl)benzotriazole, 2-(2'-hydroxy-3',6'-(1,1-dimethylbenzylphenyl)benzotriazole, 2(2'-hydroxy-3',5'-di-t-amylphenyl)benzotriazole, bis[2-hydroxy-5-methyl-3-(benzotriazol-2-yl) phenyl]methane, bis[2-hydroxy-5-t-octyl-3-(benzotriazol-2-yl)phenyl]methane, 2-hydroxy-4-(2-acrylocyloxyethoxybenzophenone), 2-hydroxy-4-(2-hydroxy-3-methacryloxy)propoxy-benzophenone, 2,2'-dihydroxy-4-methoxybenzophenone, 2,4-dihydroxybenzophenone, 2,2'-dihydroxy-4,4-dimethoxybenzophenone, 2,2',4,4'-tetrahydroxybenzophenone, ethyl-2-cyano-3,3-diphenyl acrylate, 2-ethexyl-2-cyano-3,3-diphenyl acrylate, 2',2',4-trihydroxybenzophenone, 2-hydroxy-4-acryloyloxyethoxybenzophenone, 2-hydroxy-4-acryloyloxyethoxybenzophenone, 4-hydroxy-4-methoxybenzophenone and 2-hydroxy-4-n-octoxybenzophenone.

According to the disclosure, the mass fraction of the UV absorber in the base material is of a magnitude such that the upper cut-off wavelength of the band-stop filter effect defined by a transmittance of 2% for light that is incident on the front surface at an angle of incidence, transmitted through the spectacle lens and emergent from the back surface is in a wavelength range between 325 nm and 360 nm for every angle of incidence between 0° and 15°. To put it another way, the UV cut-off defined by a transmittance of 2% for light incident on the front surface of the spectacle lens according to the disclosure is in the wavelength interval between 325 nm and 360 nm for every angle of incidence between 0° and 15°. In the wavelength range between 280 nm and the UV cut-off, the transmittance of the ultraviolet light incident on the front surface is accordingly always below 2%. At the UV cut-off wavelength, the transmittance is precisely 2%.

From the inventors' insight according to which light in the wavelength range between 355 nm and 390 nm is beneficial for controlling the longitudinal growth of the eye and, furthermore, in particular light in the wavelength range between 305 nm and 325 nm is deemed to have an effect harmful to the eye, it is further advantageous if the UV cut-off in accordance with the above definition is typically between 325 nm and 350 nm, and owing to the further local hazard maximum of the spectral weighting function $W(\lambda)$, is more typically at wavelengths in the range between 335 nm and 360 nm, even more typically between 340 nm and 360 nm, and yet even more typically between 340 nm and 350 nm.

From the inventors' insight according to which light in the wavelength range between 355 nm and 390 nm is beneficial for controlling the longitudinal growth of the eye, the further requirement according to the disclosure is made of the spectacle lens that the transmittance for light having the wavelength of 380 nm that is incident on the front surface at an angle of incidence, is transmitted through the spectacle lens and emergent from the back surface is between 25% and 80% for every angle of incidence between 0° and 15°. A compromise with regard to sufficient control of the longitudinal growth and reduction of the eye damage potential that can be derived from the spectral weighting function $W(\lambda)$ is a transmittance of between 35% and 70%, typically between 40% and 60%, for light having the wavelength of 380 nm that is incident on the front surface at an angle of incidence, is transmitted through the spectacle lens and emergent from the back surface for any angle of incidence between 0° and 15°.

The concept according to the first variant (i) does not require the spectacle lens to have a coating. It is expedient, however, if the spectacle lens has a coating, typically a coating provided or applied on the front surface and on the back surface, having an antireflective effect particularly in the "beneficial spectral range." The coating can comprise a plurality of layers of different thicknesses. The coating can comprise the front-side partial coating and a back-side partial coating, which can in turn each consist of a layer sequence of a plurality or a multiplicity of individual layers.

The object stated in the introduction is achieved in its entirety by a spectacle lens as disclosed herein according to the first variant (i) of the disclosure.

To realize the second variant (ii), the disclosure provides spectacle lens having the following properties:

In accordance with a spectacle lens according to the first variant (i), the spectacle lens has an object-side front surface (during use as intended) and an eye-side back surface (during use as intended). The spectacle lens is based on a base material with a mass fraction that differs from zero of a UV absorber that brings about a band-stop filter effect for ultraviolet light that is incident on the front surface at an angle of incidence, transmitted through the spectacle lens and emergent from the back surface.

As in the case of a spectacle lens for realizing the first variant (i), the base material can be any material suitable for producing spectacle lenses. In particular, the base material can be one or more of the following materials: mineral glass, poly allyl diglycol carbonate, polyurea, polyacrylates, polyurethane, polycarbonate, polythiourethane, and/or polyepisulfide. The use of poly allyl diglycol carbonate as base material is not excluded, however, in the context of the concept according to the second variant (ii) of the disclosure. However, materials considered in particular for use as base material are all materials that satisfy the optical requirements of a spectacle lens and have a refractive index of more than 1.45, in particular of more than 1.50, more particularly a refractive index of more than 1.55, and even more particularly a refractive index of more than 1.6.

As UV absorber, it is possible to use all materials which were specified above in connection with variant (i) and which are compatible with the base material and the processing conditions and which have the desired UV absorption properties described below. In particular, in the case of this variant (ii), too, it is possible for the base material not just to be admixed with a single UV absorber material, but rather to comprise two or more chemical compounds. In principle, as UV absorber materials, consideration is given to chemical compounds from the group of benzotriazoles, benzophenols, benzophenones and cyanoacrylates. By way of example, once again attention is drawn to the following compounds and mixtures thereof: 2(2'-hydroxy-5'-methylphenyl)benzotriazole, 2-hydroxy-4-n-acetoxybenzophenone, 2-(2'-hydroxy-5-5-octylphenyl)benzotriazole, 2-(2'-hydroxy-3',6'-(1,1-dimethylbenzylphenyl)benzotriazole, 2(2'-hydroxy-3',5'-di-t-amyl-phenyl)benzotriazole, bis[2-hydroxy-5-methyl-3-(benzotriazol-2-yl)phenyl]methane, bis[2-hydroxy-5-t-octyl-3-(benzotriazol-2-yl)phenyl]methane, 2-hydroxy-4-(2-acrylocyloxyethoxybenzophenone), 2-hydroxy-4-(2-hydroxy-3-methacryloxy)propoxybenzophenone, 2,2'-dihydroxy-4-methoxybenzophenone, 2,4-dihydroxybenzophenone, 2,2'-dihydroxy-4,4-dimethoxybenzophenone, 2,2',4,4'-tetrahydroxybenzophenone, ethyl-2-cyano-3,3-diphenyl acrylate, 2-ethexyl-2-cyano-3,3-diphenyl acrylate, 2',2',4-trihydroxybenzophenone, 2-hydroxy-4-acryloyloxyethoxybenzophenone, 2-hydroxy-4-acryloyloxyethoxybenzophenone, 4-hydroxy-4-methoxybenzophenone, and 2-hydroxy-4-n-octoxybenzophenone.

The concept according to the second variant (ii), namely that of providing a coating, in particular an antireflection coating, of the spectacle lens comprising a plurality of dielectric layers and acting on the principle of constructive and destructive interference, and configuring the coating such that more beneficial UV light that delays the progress of short-sightedness reaches the eye of the wearer of spectacles, does not require light in the beneficial spectral range to be able to be transmitted through the spectacle lens. The concept according to the second variant (ii) accordingly also and primarily concerns spectacle lenses whose base material itself is intrinsically nontransparent or only weakly transparent in the beneficial spectral range between 355 nm and 390 nm or whose base material comprises a UV absorber which prevents the spectacle lens from being transmissive or at least transmissive to a sufficiently beneficial extent for light in the beneficial spectral range between 355 nm and 390 nm.

The coating of a spectacle lens which realizes the concept according to the secondary variant (ii) has a reflectance which, for light having the wavelength of 380 nm that is incident on the back surface at an angle of incidence is greater than 8% for every angle of incidence between 30° and 45°. The reflectance R(λ), which is also called reflectivity in the literature, is defined as the ratio between reflected and incident (on one of the mutually opposite spectacle lens surfaces) luminous flux. The less light in the beneficial spectral range between 355 nm and 390 nm that is incident on the front side of the spectacle lens, is transmitted through the spectacle lens and emerges from the back surface and is incident on the eye of the wearer of spectacles, the greater the requirement for light in this crucial spectral range that is incident on the back of the spectacle lens to be directed into the eye by reflection at the back surface of the spectacle lens. The decisive angular range in accordance with the above requirement is between 30° and 45°.

With increasing nontransparency of the spectacle lens in this spectral range, it is more desirable for the reflectance of the coating for light having the wavelength of 380 nm that is incident on the back surface of an angle of incidence to be greater than 10% or greater than 15% or greater than 20% or greater than 25% or greater than 30% or greater than 35% or even greater than 40% for every angle of incidence between 30° and 45°.

To prevent harmful light from being reflected from the back side of the spectacle lens into the eye, the coating according to the disclosure is furthermore configured such that the spectacle lens has an antireflective effect for ultraviolet light incident on the back surface at an angle of incidence, the effect being configured in such a way that the reflectance in a wavelength range between 280 nm and a cut-off wavelength that is between 325 nm and 350 nm and is defined by a reflectance of 5% is below 5% for every angle of incidence between 30° and 45°. To put it another way, the coating is configured such that, in the wavelength range between 280 nm and the cut-off wavelength, the reflectance of the ultraviolet light incident on the back surface is accordingly always below 5%. At the cut-off wavelength, the reflectance is precisely 5%.

The object stated in the introduction is achieved in its entirety by the spectacle lens having a reflectance according to the second variant (ii) of the concept underlying the disclosure.

Exemplary embodiments, in particular of the first variant (i) of the inventive concept, which, however, can in principle also be combined with exemplary embodiments of the second variant (ii) of the disclosure, are described in the sections directly hereinafter.

The mass fraction of the UV absorber in the base material is typically chosen not only such that the transmittance for light having the wavelength of 380 nm that is incident on the front surface at an angle of incidence, is transmitted through the spectacle lens and emergent from the back surface is between 25% and 80% for every angle of incidence between 0° and 15°, but also such that the transmittance for light that is incident on the front surface at an angle of incidence, is transmitted through the spectacle lens and emergent from the back surface for all wavelengths in the wavelength range between 355 nm and 390 nm is greater than 5%, typically greater than 6%, more typically greater than 7%, for every angle of incidence between 0° and 15°. The corresponding transmittance for light in the wavelength range between 380 nm and 390 nm, in a particular configuration, is even chosen such that it exceeds the transmittance at 380 nm. Additionally or alternatively, the corresponding transmittance for light in the wavelength interval between 355 nm and 380 nm can be lower than the value of the transmittance at 380 nm. This ensures that enough beneficial UV light that delays the progress of short-sightedness reaches the eye of the wearer of spectacles.

To ensure that a sufficient amount of the light in the beneficial spectral range between 355 nm and 390 nm that is incident on the front surface of the spectacle lens can enter the eye in conjunction with chemically suitable UV absorber material and sufficient mass fraction of the UV absorber chosen, the UV absorber in the base material can have a mass fraction of a magnitude such that the upper cut-off wavelength of the band-stop filter effect defined by a transmittance of 2% for light that is incident on the front surface at an angle of incidence, is transmitted through the spectacle lens and emergent from the back surface is either in the wavelength interval between 325 nm and 360 nm or in the wavelength interval between 325 nm and 350 nm or in the wavelength interval between 325 nm and 340 nm for every angle of incidence between 0° and 15°, and that the transmittance for light having the wavelength of 380 nm that is incident on the front surface at an angle of incidence, is transmitted through the spectacle lens and emergent from the back surface is between 25% and 80% for every angle of incidence between 0° and 15°, and that the spectacle lens comprises a coating that brings about an antireflective effect for light incident on the front surface at an angle of incidence, the coating being configured in such a way that the reflectance for light incident on the front surface at an angle of incidence in the wavelength range between 355 nm and 390 nm is less than 5%, typically less than 4%, more typically less than 3%, for every angle of incidence between 0° and 15°.

Particularly in the case of clear correction lenses, it is expedient if the transmittance thereof over the entire visible spectral range is configured such that it is as high as possible and largely homogeneous. For this reason, in a particular configuration, the disclosure provides a coating which defines the reflectance alternatively or additionally between 380 nm and 780 nm or between 400 nm and 700 nm to be less than 5%, typically less than 4%, more typically less than 3%, for every angle of incidence between 0° and 15°.

In the case of a spectacle lens of the type described above in which the mass fraction of the UV absorber in the base material is of a magnitude such that the upper cut-off wavelength of the band-stop filter effect timed by a transmittance of 2% for light that is incident on the front surface at an angle of incidence, transmitted through the spectacle lens and emergent from the back surface is between 325 nm and 350 nm for every angle of incidence between 0° and 15°, the coating can be configured in such a way that the coating brings about a reflective effect for ultraviolet light incident on the back surface at an angle of incidence, the effect being configured in such a way that the reflectance for ultraviolet light incident on the back surface at an angle of incidence in the wavelength range between 280 nm and 335 nm is greater than 2% for every angle of incidence between 30° and 45°. In the wavelength range between 280 nm and 310 nm, the reflectance can even be greater than 10% or advantageously even greater than 20%.

Exemplary embodiments in particular of the second variant (ii) of the disclosure, which, however, can in principle also be combined with exemplary embodiments of the first variant (i) of the inventive concept, are described in the sections directly succeeding the present section.

One exemplary embodiment of the spectacle lens according to the disclosure provides that the mass fraction of the UV absorber in the base material is of a magnitude such that the upper cut-off wavelength of the band-stop filter effect defined by a transmittance of 2% for light that is incident on the front surface at an angle of incidence, transmitted through the spectacle lens and emergent from the back surface is in the wavelength interval between 325 nm and 350 nm for every angle of incidence between 0° and 15°, and in that the transmittance for light having the wavelength of 380 nm that is incident on the front surface at an angle of incidence, is transmitted through the spectacle lens and emergent from the back surface is less than 50% for every angle of incidence between 0° and 15°, and in that the spectacle lens comprises a coating that brings about an antireflective effect for ultraviolet light that is incident on the back surface at an angle of incidence, the coating being configured in such a way that the reflectance in a wavelength range between 280 nm and a cut-off wavelength that is between 325 nm and 350 nm and is defined by a reflectance of 5% is below 5% for every angle of incidence between 30° and 45°, and that the reflectance for light having the wavelength of 380 nm that is incident on the back surface at an angle of incidence is greater than 8% for every angle of incidence between 30° and 45°. To put it another way, the coating is configured such that, according to a first requirement, in the wavelength range between 280 nm and the cut-off wavelength, the reflectance of the ultraviolet light incident on the back surface is accordingly always below 5%. At the cut-off wavelength, the reflectance is precisely 5%. The cut-off wavelength is preferably between 325 nm and 350 nm. According to a second requirement the coating is furthermore configured such that the reflectance for light having the wavelength of 380 nm that is incident on the back surface at an angle of incidence is greater than 8%. These requirements apply to light incident on the back surface of the spectacle lens for every angle of incidence between 30° and 45°.

To ensure that enough light in the beneficial spectral range described above reaches the eye of the wearer of spectacles, the spectacle lens in the case of the last-described exemplary embodiment according to the disclosure can be a coating that is configured in such a way that the reflectance for light that is incident on the back surface at an angle of incidence for every wavelength in the wavelength range between 355 nm and 390 nm is greater than 5% for every angle of incidence between 30° and 45°.

To ensure that visible light can penetrate into the spectacle lens through the front surface, the front-surface coating, that is to say the coating part arranged on the front side of the spectacle lens, is configured in such a way that the reflectance for light that is incident on the front surface at an angle of incidence in the wavelength range between 380 nm and 780 nm or in the wavelength range between 400 nm and 700 nm is less than 5% for every angle of incidence between 0° and 15°.

To prevent that hazardous light passes into the eye of the wearer of spectacles by reflection at the back surface of the spectacle lens, the coating can be configured in such a way that the reflectance for light that is incident on the back surface at an angle of incidence in the wavelength range between 280 nm and 325 nm is less than 5% for every angle of incidence between 30° and 45°.

It should be clarified that, in the case of a spectacle lens according to the disclosure of all types described above, the coating can be embedded on the front surface side and/or on the back surface side and/or into the base material with the UV absorber. The coating can thus be applied, e.g., only on the front side on the base material with the UV absorber of the spectacle lens. The coating can, e.g., also be applied only on the back side on the base material with the UV absorber of the spectacle lens. By way of example, it is also possible for a first partial coating to be applied on the front side on the base material with the UV absorber of the spectacle lens and for a second partial coating to be applied on the back side on the base material with the UV absorber of the spectacle lens.

The coating, or, if applicable, also each of the partial coatings, can comprise a plurality of dielectric layers, wherein respectively adjacent layers regularly differ in their respective refractive index, which is generally predefined by the material and/or the layer thickness. In the context of the present disclosure, layers should be understood to mean in particular those having a minimum thickness of 1 nm. Typical materials for coatings of this type are metal oxides, metal fluorides, metal nitrides, and diamondlike carbon, or combinations thereof. Appropriate metal oxides are, e.g., one or more compounds of the group including chromium dioxide, aluminum oxide, titanium dioxide, indium tin oxide (ITO), zirconium dioxide, and silicon dioxide, or combinations thereof. Typical layer thicknesses are in the range of between a few nanometers and hundreds of nanometers.

It goes without saying that the spectacle lens can also comprise further layers, in particular functional layers of the type described in the introductory part of the description. However, these generally have no or only a secondary influence on the transmission or reflection behavior of the coating overall, which behavior is decisive for the reflectance in the context of the present disclosure.

The inventors furthermore provide a computer-implemented method for calculating a spectacle lens with an object-side front surface and an eye-side back surface, comprising a base material with a mass fraction that differs from zero of a UV absorber that brings about a band-stop filter effect for ultraviolet light that is incident on the front surface at an angle of incidence, transmitted through the spectacle lens and emergent from the back surface, in accordance with the first variant (i) of the inventive concept. This computer-implemented method includes the following steps:

a) Providing data representing the base material. The data provided in step a) can comprise, e.g., the real part $n(\lambda)$ and, if appropriate, the imaginary part $k(\lambda)$ of the complex refractive index that can be assigned to the base material.

b) Providing data representing the UV absorber. These data provided in step b) can comprise, e.g., the real part $n(\lambda)$ and, if appropriate, the imaginary part $k(\lambda)$ of the complex refractive index that can be assigned to the UV absorber.

c) Providing data representing the geometry of the front surface of the spectacle lens. These data provided in step c) can comprise, e.g., the curvature of the front surface, which, if appropriate, can also be set to zero. Optionally, the (front-surface partial) coating, i.e., inter alia also a sequence composed of a multiplicity of different layers, of the front surface of the spectacle lens can also be taken into account.

d) Providing data representing the geometry of the back surface of the spectacle lens. These data provided in step d) can comprise, e.g., the curvature of the back surface, which, if appropriate, can also be set to zero. Optionally, the (back-surface partial) coating, i.e., inter alia also a sequence composed of a multiplicity of different layers, of the back surface of the spectacle lens can also be taken into account.

e) Providing data representing a mass fraction of the UV absorber in the base material.

f) Calculating the transmittance for light of different wavelengths that is incident on the front surface at different angles of incidence, transmitted through the spectacle lens and emergent on the back surface on the basis of the data provided in steps a) to e) with variation of the data provided in steps b) and/or e) until a suitable UV absorber is identified and/or until the data representing the mass fraction of the UV absorber in the base material are such that the upper cut-off wavelength of the band-stop filter effect defined by a transmittance of 2% for light that is incident on the front surface at an angle of incidence, transmitted through the spectacle lens and emergent from the back surface is between 325 nm and 360 nm for every angle of incidence between 0° and 15°, and in that the transmittance for light having a wavelength of between 355 nm and 390 nm that is incident on the front surface at an angle of incidence, is transmitted through the spectacle lens and emergent from the back surface is between 25% and 80% for every angle of incidence between 0° and 15°.

g) Outputting the data representing the UV absorber and the data representing the mass fraction of the UV absorber in the base material for which the conditions for the transmittance as defined in step f) are met.

The object stated in the introduction is achieved in its entirety by the computer-implemented method for calculating a spectacle lens according to the first variant (i) and a method of producing such a spectacle lens as described herein.

The device according to the disclosure described below is configured for carrying out the method described above. This device configured according to the disclosure for calculating a spectacle lens with an object-side front surface and an eye-side back surface, comprising a base material with a mass fraction that differs from zero of a UV absorber that brings about a band-stop filter effect for ultraviolet light that is incident on the front surface at an angle of incidence, transmitted through the spectacle lens and emergent from the back surface includes the following components:

a) means for providing data representing the base material (e.g. the real part $n(\lambda)$ that can be assigned to the base material and, if appropriate, the imaginary part $k(\lambda)$ of the complex refractive index that can be assigned to the base material), b) means for providing data representing the UV absorber (e.g. the imaginary part $k(\lambda)$ of the complex refractive index that can be assigned to the UV absorber and, if appropriate, the real part $n(\lambda)$ of the complex refractive index that can be assigned to the UV absorber), c) means for providing data representing the geometry of the front surface of the spectacle lens (e.g. the curvature of the surface, which, if appropriate, can also be set to zero; optionally, the coating, i.e., inter alia also a stack composed of a multiplicity of different layers, of the front surface of the spectacle lens can also be taken into account), d) means for providing data representing the geometry of the back surface of the spectacle lens (e.g. the curvature of the surface, which, if appropriate, can also be set to zero; optionally, the coating, i.e., inter alia also a stack composed of a multiplicity of different layers, of the back surface of the spectacle lens can also be taken into account), e) means for providing data representing a mass fraction of the UV absorber in the base material, f) means for calculating the transmittance for light of different wavelengths that is incident on the front surface at different angles of incidence, transmitted through the spectacle lens and emergent on the back surface on the basis of the data provided in steps a) to e) with variation of the data provided in steps b) and/or e) until a suitable UV absorber is identified and/or until the data representing the mass fraction of the UV absorber in the base material are such that the upper cut-off wavelength of the band-stop filter effect defined by a transmittance of 2% for light that is incident on the front surface at an angle of incidence, transmitted through the spectacle lens and emergent from the back surface is between 325 nm and 360 nm for every angle of incidence between 0° and 15°, and in that the transmittance for light having a wavelength in a wavelength range between 355 nm and 390 nm that is incident on the front surface at an angle of incidence, is transmitted through the spectacle lens and emergent from the back surface is between 25% and 80% for every angle of incidence between 0° and 15°, g) means for outputting the data representing the UV absorber and the data representing the mass fraction of the UV absorber in the base material for which the conditions for the transmittance as defined in step f) are met.

The object stated in the introduction is achieved in its entirety by the above-described computer-implemented device for calculating a spectacle lens according to the first variant (i) of the concept underlying the disclosure.

The inventors furthermore provide a computer-implemented method for calculating a spectacle lens with an object-side front surface and an eye-side back surface, comprising a base material with a mass fraction that differs from zero of a UV absorber that brings about a band-stop filter effect for ultraviolet light that is incident on the front surface at an angle of incidence, transmitted through the spectacle lens and emergent from the back surface, in accordance with the second variant (ii). This computer-implemented method includes the following steps:

a) providing data representing the base material with the UV absorber (e.g. the real part n(λ) and, if appropriate, the imaginary part k(λ) of the complex refractive index that can be assigned to the base material with the UV absorber)

b) providing data representing the geometry of the front surface and/or the geometry of the back surface of the spectacle lens (e.g. the curvature of the respective surface, which, if appropriate, can also be set to zero)

c) providing data representing a coating having one or a plurality of layers (e.g. thicknesses and refractive indices)

d) calculating the reflectance for light of varying wavelength that is incident on the back surface of the spectacle lens at various angles of incidence with variation of the data provided in step c) until the reflectance in a wavelength range between 280 nm and a cut-off wavelength that is between 325 nm and 360 nm and is defined by a reflectance of 5% is below 5% for every angle of incidence between 30° and 45° and the reflectance for light having a wavelength in a wavelength range between 355 nm and 390 nm that is incident on the back surface at an angle of incidence is greater than 8% for every angle of incidence between 30° and 45°, and e) outputting the data representing the coating for which the conditions for the reflectance as defined in step d) are met.

The object stated in the introduction is achieved in its entirety by the computer-implemented method for calculating a spectacle lens according to the second variant (ii) and the corresponding method described above.

The (computer) device according to an aspect of the disclosure as described below is configured for carrying out the computer-implemented method described above. The device according to the disclosure for calculating a spectacle lens with an object-side front surface and an eye-side back surface, comprising a base material with a mass fraction that differs from zero of a UV absorber that brings about a band-stop filter effect for ultraviolet light that is incident on the front surface at an angle of incidence, transmitted through the spectacle lens and emergent from the back surface includes the components corresponding to the method steps mentioned above, namely a) means for providing data representing the base material with the UV absorber;

b) means for providing data representing the geometry of the front surface and/or the geometry of the back surface of the spectacle lens;

c) means for providing data representing a coating having one or a plurality of layers;

d) means for calculating the reflectance for light of varying wavelength that is incident on the back surface of the spectacle lens at various angles of incidence with variation of the data provided in step c) until the reflectance in a wavelength range between 280 nm and a cut-off wavelength that is between 325 nm and 350 nm and is defined by a reflectance of 5% is below 5% for every angle of incidence between 30° and 45° and the reflectance for light having a wavelength in a wavelength range between 355 nm and 390 nm that is incident on the back surface at an angle of incidence is greater than 8% for every angle of incidence between 30° and 45°; and e) means for outputting the data representing the coating for which the conditions for the reflectance as defined in step d) are met.

The object stated in the introduction is achieved in its entirety by the above-described computer-implemented device for calculating a spectacle lens according to the second variant (ii).

In an exemplary embodiment of the above-described method and of the above-described device for calculating a spectacle lens according to the second variant (ii), provision is made for the coating to comprise a plurality of dielectric layers and for the data representing the coating to comprise the refractive indices and the thicknesses of the dielectric layers. In particular, in method step d), the number of dielectric layers and/or the type of dielectric layers and/or the order of the dielectric layers and/or the layer thicknesses of the dielectric layers can be varied until the reflectance in a wavelength range between 280 nm and a cut-off wavelength that is between 325 nm and 360 nm and is defined by a reflectance of 5% is below 5% for every angle of incidence between 30° and 45° and the reflectance for light having a wavelength in a wavelength range between 355 nm and 390 nm that is incident on the back surface at an angle of incidence is greater than 8% for every angle of incidence between 30° and 45°. In step e) the number of dielectric layers and/or the type of dielectric layers and/or the order of the dielectric layers and/or the thicknesses of the dielectric layers are/is then output correspondingly.

The means for carrying out the method steps specified above, as mentioned under components d) and e) of the corresponding device according to the disclosure can be configured correspondingly.

A method according to an aspect of the disclosure for producing a spectacle lens uses the data output in step g) according to the first-described computer-implemented computing method according to variant (i) and/or the data output in step e) according to the last-described computer-implemented computing method according to variant (ii).

According to an aspect of the disclosure, a computer program comprising program code can also be configured for carrying out all the method steps according to one or both of the above-described computer-implemented computing methods according to variant (i) or (ii) when the computer program is loaded in the computer and/or executed in a computer.

On a nonvolatile memory medium, the program code of the computer program can be configured to carry out all the method steps according to one or both of the above-described computer-implemented computing methods according to variant (i) or (ii) when the computer program is loaded in a computer and/or executed in a computer.

A further object of the disclosure is the use of a spectacle lens as disclosed herein to control the longitudinal growth of the eye in the case of adolescents with myopia progression.

A further object of the disclosure is a method for controlling the longitudinal growth of the eye in the case of adolescents with myopia progression, including the following steps:
  a) producing a spectacle lens (1) on the basis of the data output in step g) according to the method as disclosed herein and/or on the basis of the data output in step e) as disclosed herein, wherein the spectacle lens has a shape to bring about the desired optical direction; and
  b) wearing spectacles having this spectacle lens.

The stated use and the stated method correct defective vision in the case of adolescents with myopia progression and, as a result of the transmission and/or reflection properties according to the disclosure, allow better access to the eye for the UV radiation that retards longitudinal growth.

BRIEF DESCRIPTION OF THE DRAWINGS

The disclosure will now be described with reference to the drawings wherein.

DESCRIPTION OF EXEMPLARY EMBODIMENTS

The disclosure described above comprises—as has already been explained in detail above—two possibilities that are independent, but are indeed combinable with one another, of allowing more light having the wavelength of around 380 nm to penetrate into the eye, namely (i) modification of the UV absorber in the base or substrate material of the spectacle lens by comparison with conventional spectacle lenses and (ii) optimization in particular of the back-side antireflection coating specifically in the angular range of 30° to 45°.

Variant (i): Modification of the UV Absorber in the Substrate Material

Figure 1:
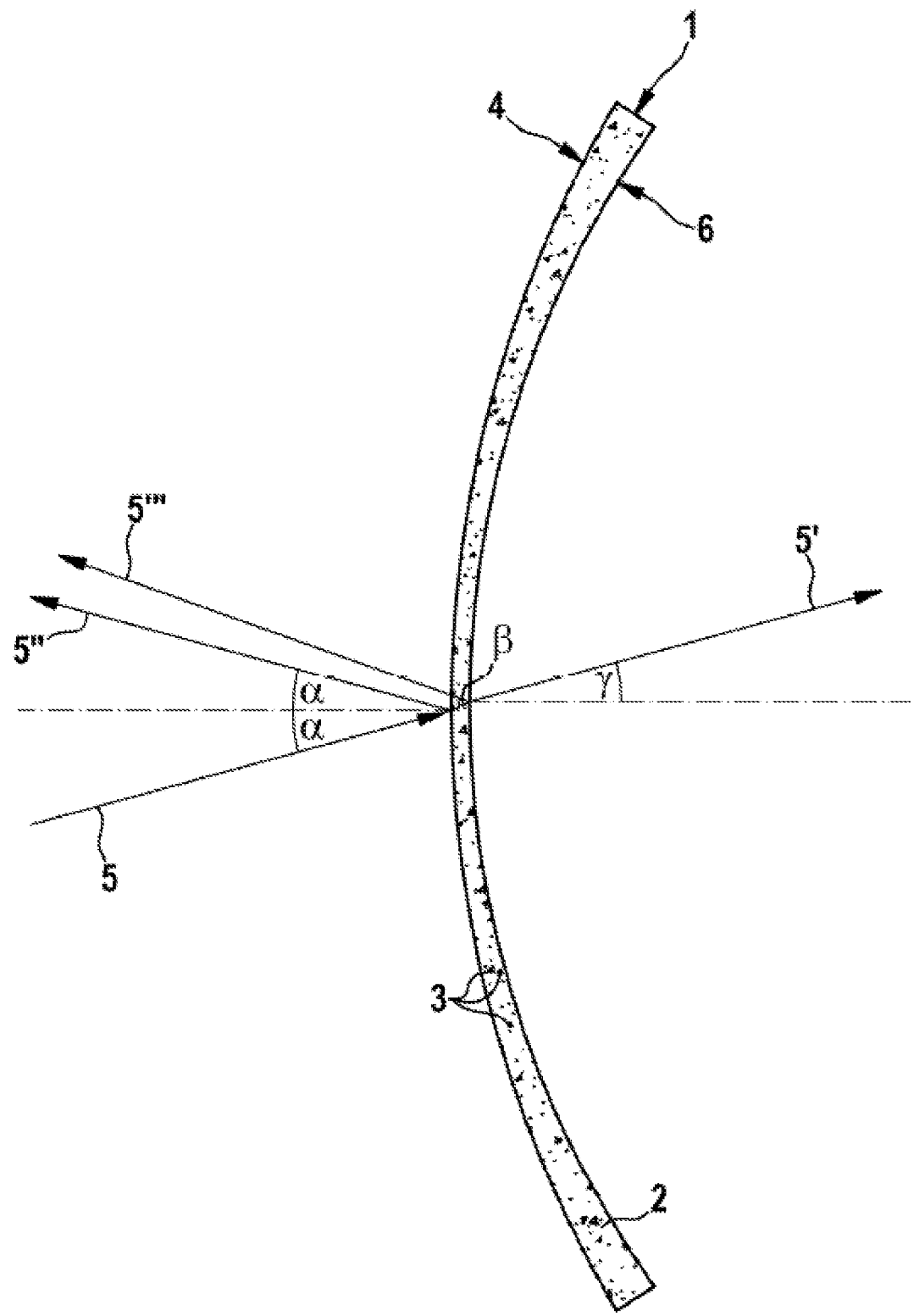
FIG. 1 shows transmission and reflection of a light ray incident on the front surface of a spectacle lens composed of a base material with a UV absorber.

FIG. 1 shows a spectacle lens 1 of a base material 2 having a certain mass fraction of a UV absorber 3, on the front surface 4 of which a light ray 5 is incident at an angle α, which light ray is transmitted through the spectacle lens 1 with partial absorption and leaves the spectacle lens again on the back surface 6 thereof as light ray 5' at the angle γ of emergence. The FIG. furthermore shows that part of the light ray 5 is reflected at the angles α and β at the front surface 4 and at the back surface 6 and propagates as light rays 5" and 5''' on the object side surface. The presence of the UV absorber 3 is identified by dots in the figure.

It turns out that there is a cut-off wavelength $\lambda_{UV\ cut-off}$, below which ultraviolet light is absorbed practically completely by the base material (with UV absorber) of the spectacle lens. The cut-off wavelength $\lambda_{UV\ cut-off}$ is characterized by a transmittance of 2% and is referred to as the UV cut-off wavelength or UV cut-off for short. The setting of the UV cut-off is effected in the different substrate materials on the basis of the choice of the UV absorber, which has to be compatible with the substrate material and the processing conditions, and the optimization of its concentration. Both factors can be influenced to control the absorption of light incident on the front surface of a spectacle lens around 380 nm.

Figure 2:
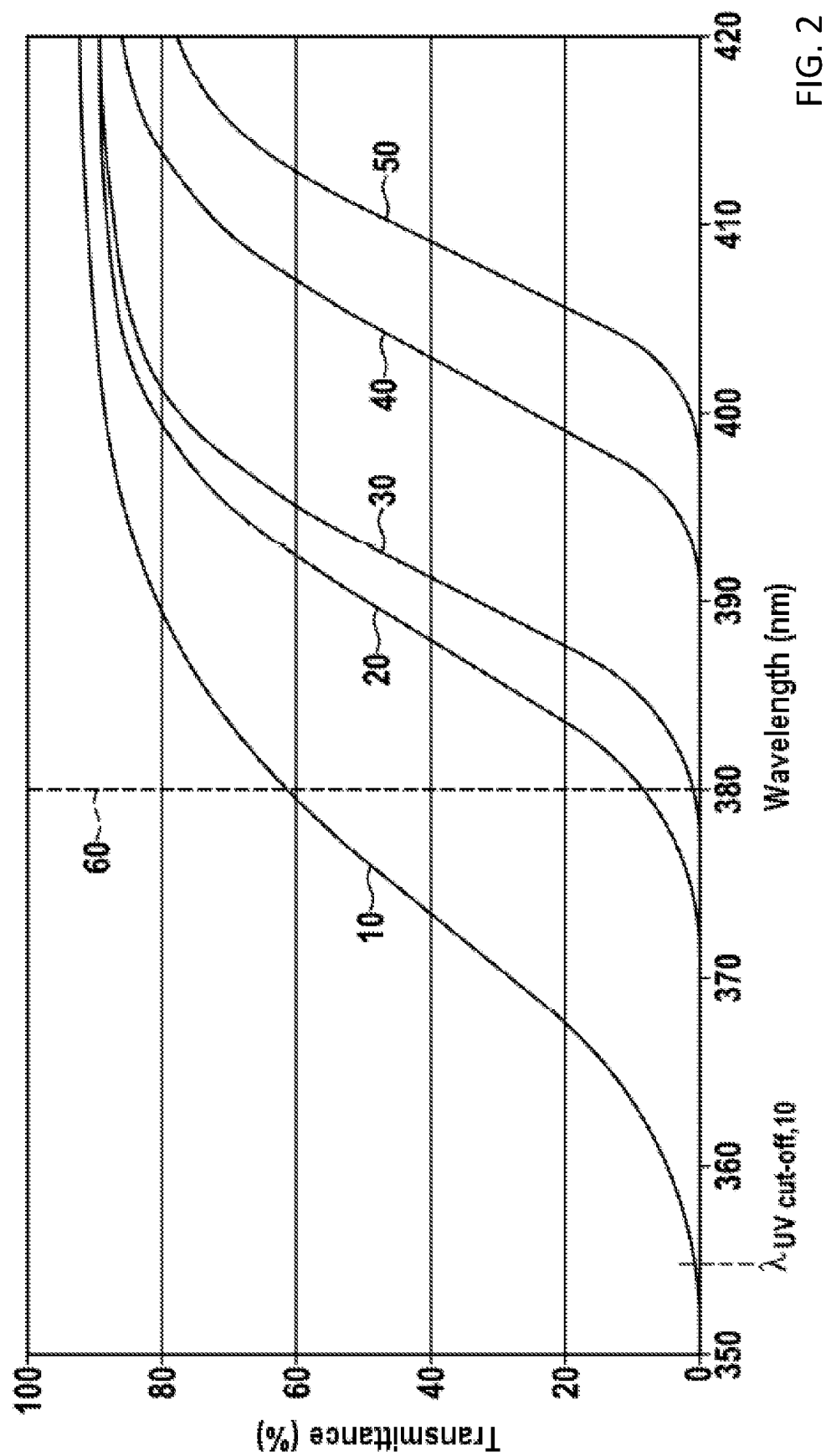
FIG. 2 shows transmission spectra in the range around 380 nm on the basis of spectacle lenses with a dioptric power of −2 dpt. made from different base materials with or without a UV absorber.

The current state with regard to the transmission properties of spectacle lenses based on different base materials with a spherical power of −2.0 at a wavelength λ, of around 380 nm is illustrated in FIG. 2, which shows the transmittance T(λ) of spectacle lenses composed of chemical compounds obtainable under the trade names CR 39 (curve 10), Polycarbonate (curve 20), MR 8 (curve 30), MR 7 (curve 40) and MR 174 (curve 50) (see also Table 1 above). The UV cut-off wavelength $\lambda_{UV\ cut-off}$, to of CR 39 (curve 10) is illustrated by way of example in FIG. 2.

The aim is to maximize the transmission at a wavelength of approximately 380 nm (highlighted by a vertical line 60 in FIG. 2), while at the same time a UV cut-off of 340 nm to 360 nm is realized to keep as much harmful radiation as possible away from the eye of the wearer of the spectacles. The 1.50 Index-Polymer CR 39 is noticeable in this regard because in the current state already it has a UV cut-off of 355 nm and thus has a significant transmission for light around 380 nm (between 40% and 60% depending on coating). All the other spectacle lenses that are shown in FIG. 2 and based on other chemical compounds as base material have a UV cut-off at wavelengths of above 370 nm. The cause is that they already comprise a UV absorber optimized with regard to sufficiently reduced UV degradation of the base material and/or conventional protection of the eye from harmful UV radiation over the entire ultraviolet spectral range.

To modify the UV cut-off for these other spectacle lenses in the above-described manner according to the disclosure, the following UV absorbers can typically be used:

2-(2'-hydroxy-5'-tert-octylphenyl)benzotriazole. This compound is sold under the following trade names: BASF Tinuvin 329, Cytec Cyasorb UV5411, Viosorb 583 (Kyodo Chemical Co.), and Seesorb 709 (Shipro Kasei Co.), 2-(2-hydroxy-5-tert-butyl)benzotriazole. This compound is sold under the following trade name: BASF Tinuvin PS 2-(2'-hydroxy-3'-tert-butyl-5'-methylphenyl)-5-chlorobenzotriazole. This compound is sold under the trade name: BASF Tinuvin 326.

(2-hydroxy-3-dodecyl-5-methylphenyl)benzotriazole. This compound is sold under the trade name: BASF Tinuvin 571.

When setting the UV absorber, care should be taken precisely to ensure that as little of the harmful UV radiation, and if possible down to none at all, can pass into the eye, while the transmission of the beneficial wavelengths is optimized.

Figure 3:
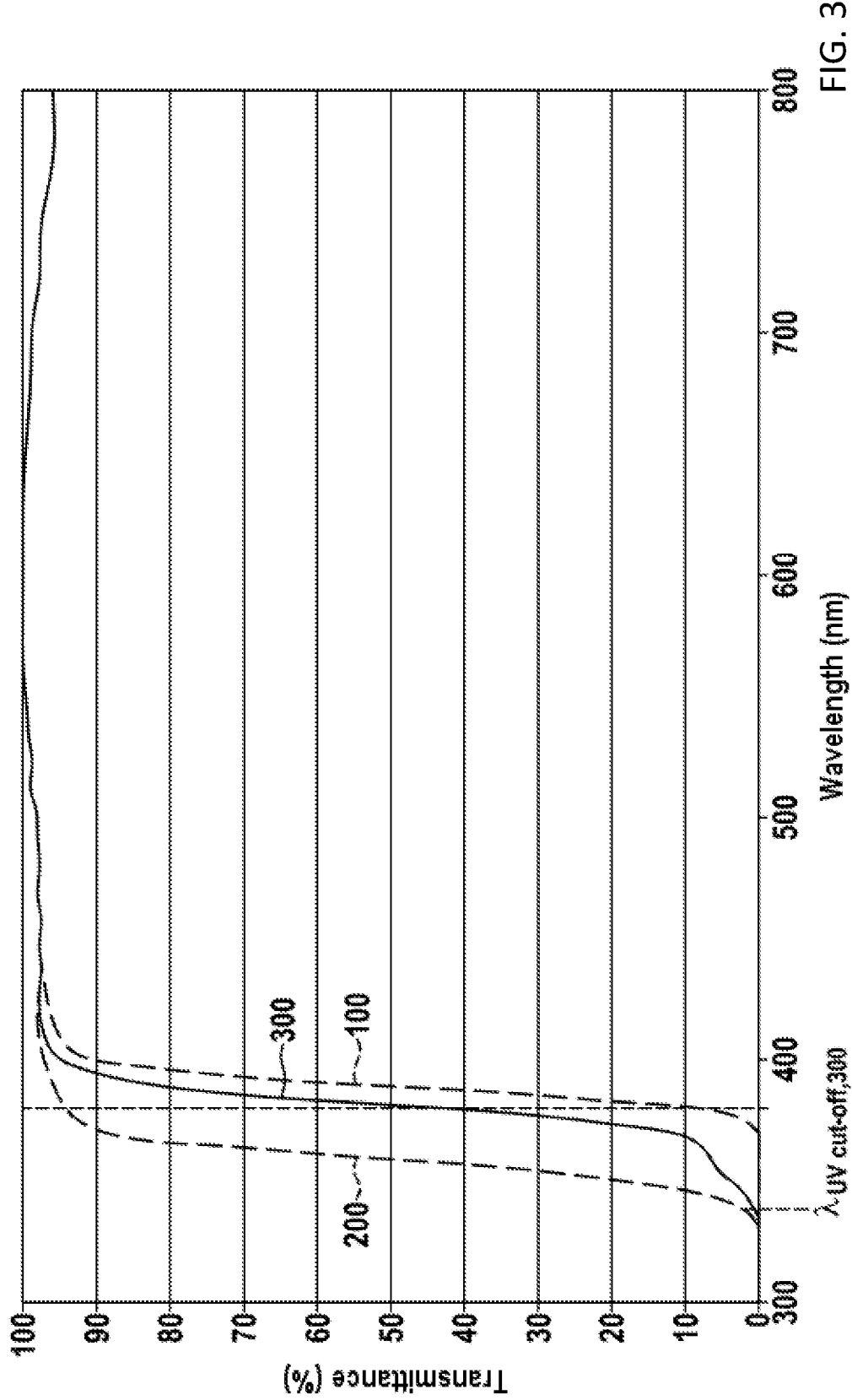
FIG. 3 shows simulated transmission curves of spectacle lenses of different base materials with different UV absorbers.

FIG. 3 shows theoretical simulated transmission spectra for MR 8 substrates coated with an antireflection coating on both sides and having different UV absorber contents. The simulation was carried out by means of the methods described in the general part of the description and using the commercially available software mentioned in the introductory part of the description. Curve 100 shows the transmittance for a currently commercially available spectacle lens comprising a base material admixed with a UV absorber. Curve 200 shows the transmittance for a spectacle lens comprising a base material without a UV absorber, although this is not commercially available. Curve 200 shows the transmittance for a spectacle lens optimized with regard to the disclosure, in which less UV absorber is added to the base material by comparison with that of the commercially available spectacle lens. A shift of the UV cut-off to shorter wavelengths can accordingly be achieved by reducing the UV absorber content.

Besides the setting of the UV absorber, the antireflection coating usually present should then also be modified complementarily. For this purpose, an antireflection coating that transmits relatively more radiation having the wavelengths of around 380 nm is used in each case for front- and back-side coatings.

The synthesis of the substrates described above is outlined by way of example below.

a) Synthesis Example 1 with Standard UV Absorber (Curve 100 in FIG. 3)

49.8 g of 2,5- and 2,6-bis(isocyanatomethyl)bicyclo[2.2.1]heptane, 0.05 g of a UV absorber (BASF SE, product name: Tinuvin 329), 0.06 g of dibutyltin dichloride, and 0.11 g of ZELEC UN were mixed at 20° C. and dissolved until a homogeneous mixture was produced. 23.9 g of pentaerythritol-tetrakis(3-mercaptopropionate) and 25.9 g of 4-mercaptomethyl-3,6-dithia-1,8-octanedithiol were added to this mixture and stirred once again until a homogeneous mixture was produced. This mixture was degassed for one hour at <500 Pa and then filtered through a 5 μm filter. Afterward, the solution was decanted into a shell mold. The mixture was heated from room temperature to 130° C. over a period of 45 hours. Afterward, the mold shell was removed from the furnace and opened, and the semifinished product was subjected to heat treatment at 60° C. for one hour. This results in UV protection according to the 2% criterion starting from 380 nm.

b) Synthesis Example 2 without Standard UV Absorber (Curve 200 in FIG. 3)

49.8 g of 2,5- and 2,6-bis(isocyanatomethyl)bicyclo[2.2.1]heptane, 0.06 g of dibutyltin dichloride and 0.11 g of ZELEC UN were mixed at 20° C. and dissolved until a homogeneous mixture was produced. 23.9 g of pentaerythritol-tetrakis(3-mercaptopropionate) and 25.9 g of 4-mercaptomethyl-3,6-dithia-1,8-octanedithiol were added to this mixture and stirred once again until a homogeneous mixture was produced. This mixture was degassed for one hour at <500 Pa and then filtered through a 5 μm filter. Afterward, the solution was decanted into a shell mold. The mixture was heated from room temperature to 130° C. over a period of 45 hours. Afterward, the mold shell was removed from the furnace and opened, and the semifinished product was subjected to heat treatment at 60° C. for one hour. This results in UV protection (2% criterion) starting from 330 nm.

c) Synthesis Example 3 with Small Amount of Standard UV Absorber (Curve 300 in FIG. 3

49.8 g of 2,5- and 2,6-bis(isocyanatomethyl)bicyclo[2.2.1]heptane, 0.03 g of a UV absorber (BASF SE, product name: Tinuvin 329), 0.06 g of dibutyltin dichloride and 0.11 g of ZELEC UN were mixed at 20° C. and dissolved until a homogeneous mixture was produced. 23.9 g of pentaerythritol-tetrakis(3-mercaptopropionate) and 25.9 g of 4-mercaptomethyl-3,6-dithia-1,8-octanedithiol were added to this mixture and stirred once again until a homogeneous mixture was produced. This mixture was degassed for one hour at <500 Pa and then filtered through a 5 μm filter. Afterward, the solution was decanted into a shell mold. The mixture was heated from room temperature to 130° C. over a period of 45 hours. Afterward, the mold shell was removed from the furnace and opened, and the semifinished product was subjected to heat treatment at 60° C. for one hour. This results in UV protection (2% criterion) starting from 340 nm.

The complementary modification of the antireflection coating to obtain the transmission curve 300 is implemented by virtue of the fact that the front- and back-side coating in each case requires an antireflective embodiment that transmits relatively more radiation having the wavelengths of around 380 nm. Typically, the coating can be chosen such that little radiation is reflected in the range around 315 nm specifically on the back side. In particular, the coating on both sides can be realized with the layer sequence shown in Table 2 and discussed below in conjunction with the optimization of the back-side antireflection coating.

For (ii) optimization, in particular of the back-side antireflection coating, more particularly in the angular range between 30° and 45°:

Central criteria of variant (ii) are, firstly, the increase in the reflection of wavelengths around 380 nm and, secondly, the provision of simultaneous protection by little reflection of hazardous UV radiation around 310 nm.

Light incident on the back side of the spectacle lens from the rear can pass into the eye of the wearer of spectacles predominantly only if it is incident on the back surface at an angle of incidence in the angular range of between 30° and 45°. In this respect, reference is made in particular to the explanations in U.S. Pat. No. 8,870,374 B2 and the description at the URL www.essilor.de/brillenglaser/veredelungen/Seiten/CrizalUV.aspx.

a) First Exemplary Embodiment of an Antireflection Coating:

Using the software from OptiLayer as mentioned in the introductory part of the description and employing the method presented in the general part of the description, the layer sequence indicated in table 2 below was determined for an antireflection coating:

TABLE 2

Antireflection coating according to the first exemplary embodiment

| Layer | Thickness (nm) |
|---|---|
| base material with UV absorber | |
| Hard layer | 3000.0 |
| $ZrO_2$ | 18.3 |
| $SiO_2$ | 30.1 |
| $ZrO_2$ | 81.1 |
| $TiO_2$ | 12.2 |
| $ZrO_2$ | 40.8 |
| ITO | 3.0 |
| $TiO_2$ | 5.0 |
| $SiO_2$ | 88.1 |

Figure 4:
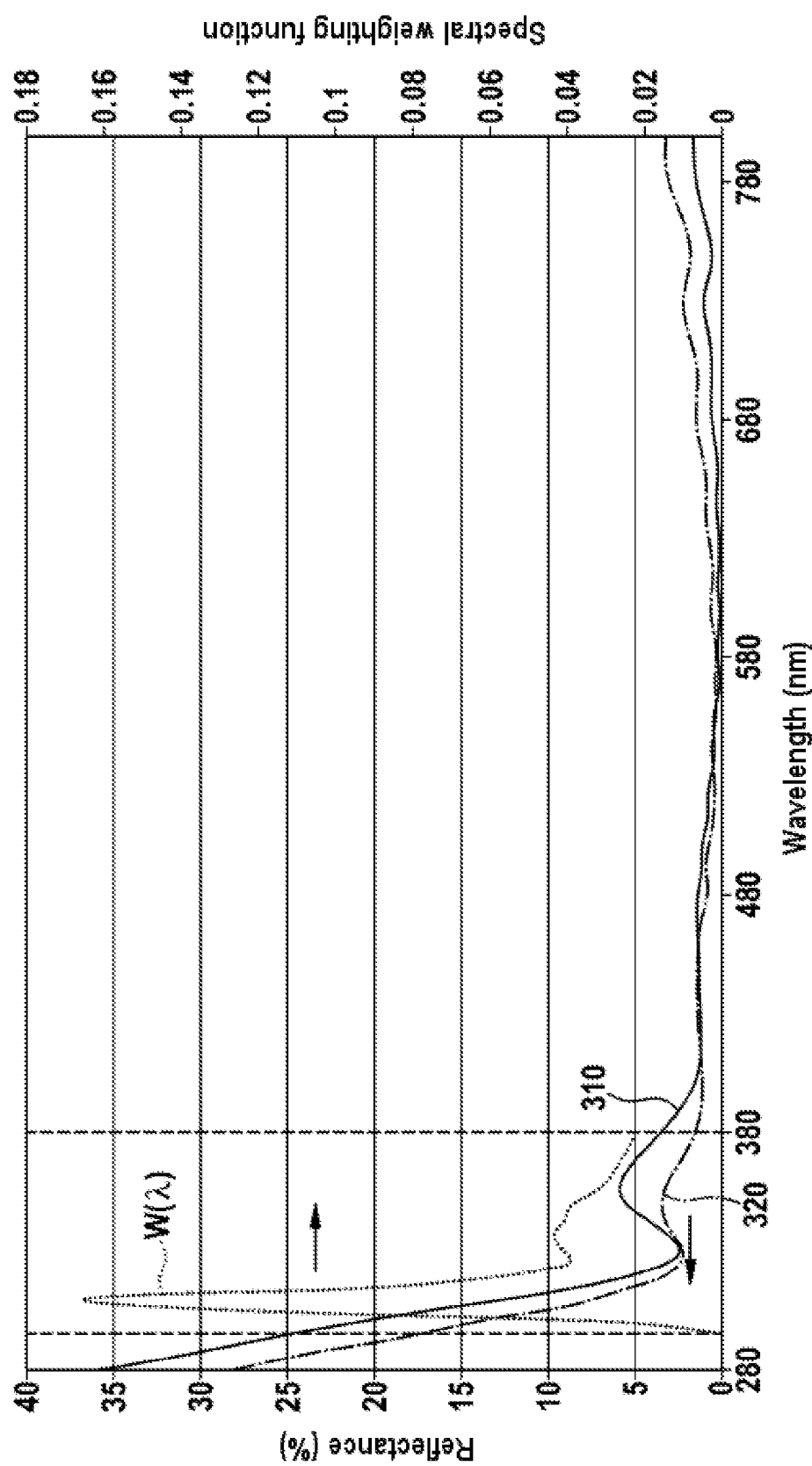
FIG. 4 shows simulated reflection curves of a spectacle lens based on a base material with UV absorber with back-surface coating for different angles of incidence of light on the back surface.

The transmission spectra for the three spectacle lenses described above under the section "For (i) modification of the UV absorber in the substrate material" comprising uniform base material MR 8 and different mass fractions of a UV absorber using a coating on both sides according to Table 2 are shown in FIG. 3. The reflectance for different angles of incidence on the back side of the spectacle lenses is largely independent of the UV absorber content in the base material and illustrated for the angles of incidence 0° (curve 310) and 35° (curve 320) in FIG. 4. The reflection curves 310 and 320 correspond to the transmission curve 300 of the spectacle lens with medium UV absorber content. FIG. 4 furthermore shows the weighting function W(λ) according to the standard DIN EN ISO 13666:2013-10 to demonstrate the distinction between beneficial and hazardous UV radiation.

The reflection for the present application example is only 1 to 6% for beneficial UV wavelengths between 355 nm and 390 nm. This ensures that the UV transmissivity in this range is not adversely affected by the coating. The dotted curve indicates which wavelengths are particularly harmful (λ, <325 nm). The latter are still absorbed in the substrate by the UV absorber with a cut-off at approximately 355 nm.

b) Second Exemplary Embodiment of an Antireflection Coating

Using the software from OptiLayer as mentioned in the introductory part of the description and employing the method presented in the general part of the description, the layer sequence indicated in Table 3 below was determined for an antireflection coating:

TABLE 3

Antireflection coating according to the second exemplary embodiment

| Layer | Thickness (nm) |
|---|---|
| Base material with UV absorber | |
| Hard layer | 3000.0 |
| $ZrO_2$ | 6.0 |
| $SiO_2$ | 218.2 |
| $TiO_2$ | 25.9 |
| $SiO_2$ | 16.4 |
| $TiO_2$ | 66.1 |
| $SiO_2$ | 20.6 |
| ITO | 3.0 |
| $TiO_2$ | 5.4 |
| $SiO_2$ | 71.7 |

Figure 5:
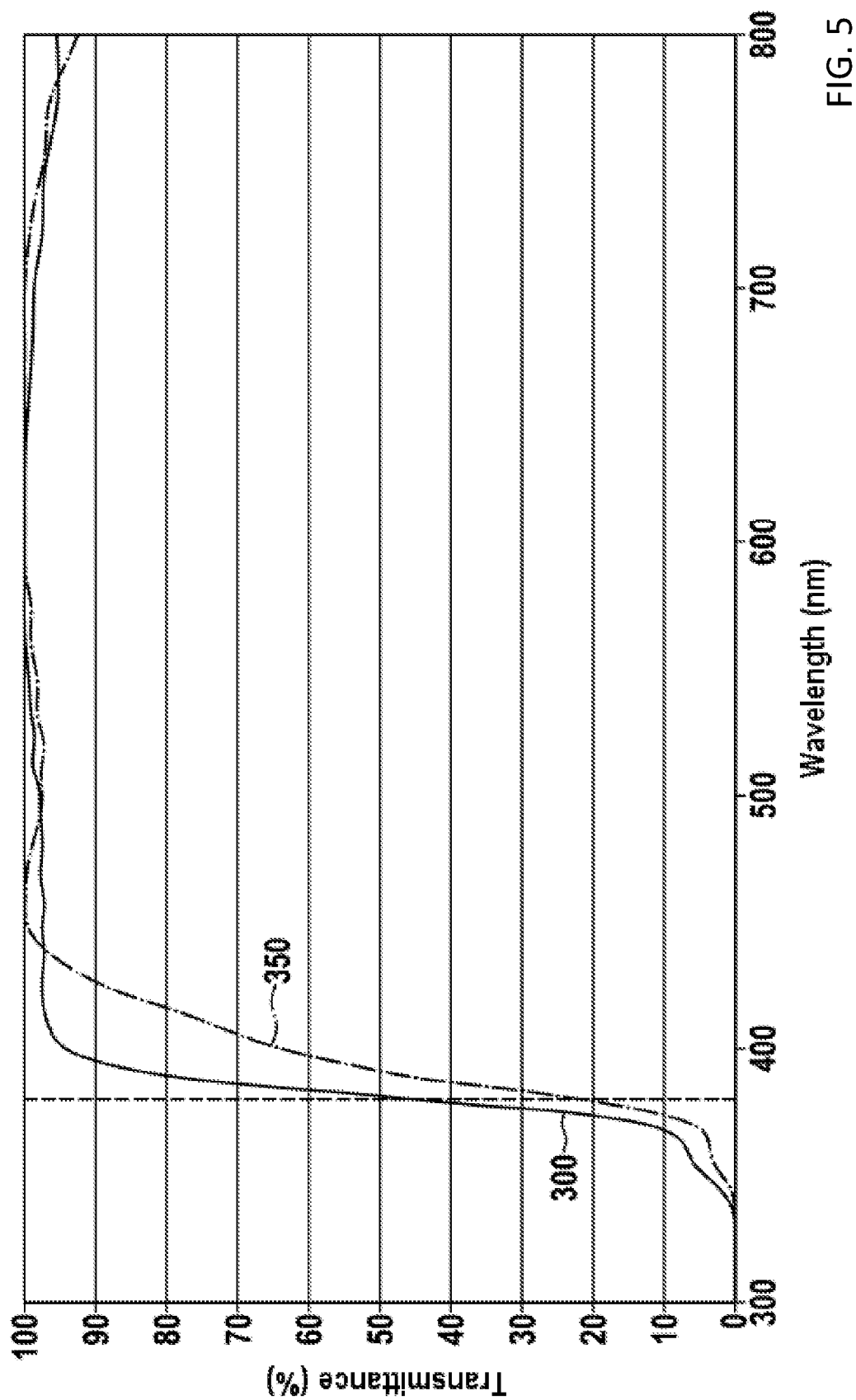
FIG. 5 shows simulated transmission curves of spectacle lenses of identical base materials and UV absorbers but with different front- and back-surface coatings.
Figure 6:
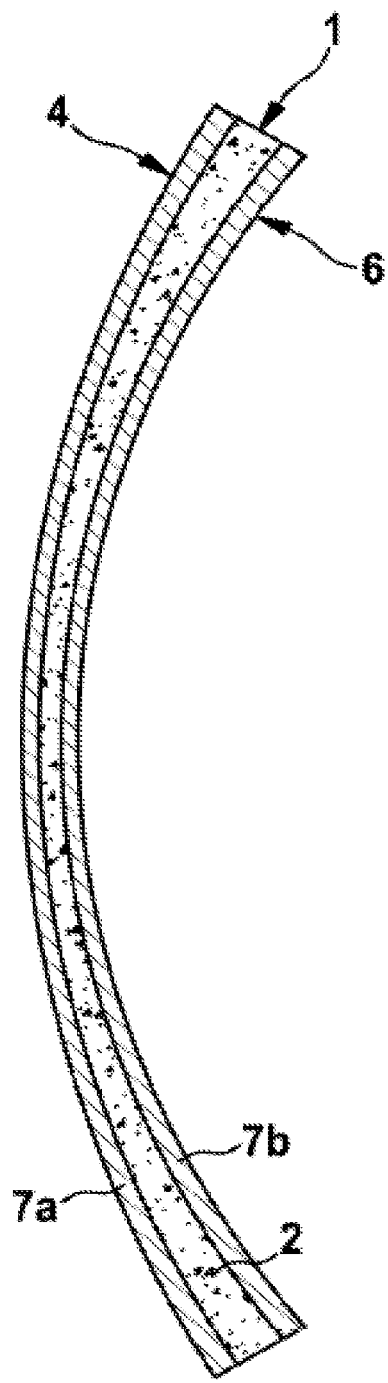
FIG. 6 shows a spectacle lens composed of a base material with UV absorber and front- and back-surface coating.

The transmission spectrum for a spectacle lens with an MR 8 base material and UV absorber of the composition indicated under subsection a) of the section "For (i) modification of the UV absorber in the substrate material" and a coating on both sides with the layer sequence indicated in table 3 is shown as curve 350 in FIG. 5. For comparison, the curve 300 in FIG. 3 is also depicted in FIG. 5. FIG. 6 shows for clarification the spectacle lens 1 composed of the base material 2 admixed with the UV absorber and the coating consisting of the two partial coatings 7a and 7b arranged on the front side and back side. Each of the partial coatings 7a, 7b, proceeding from the base material (=substrate), has the layer sequence indicated in Table 3.

Figure 7:
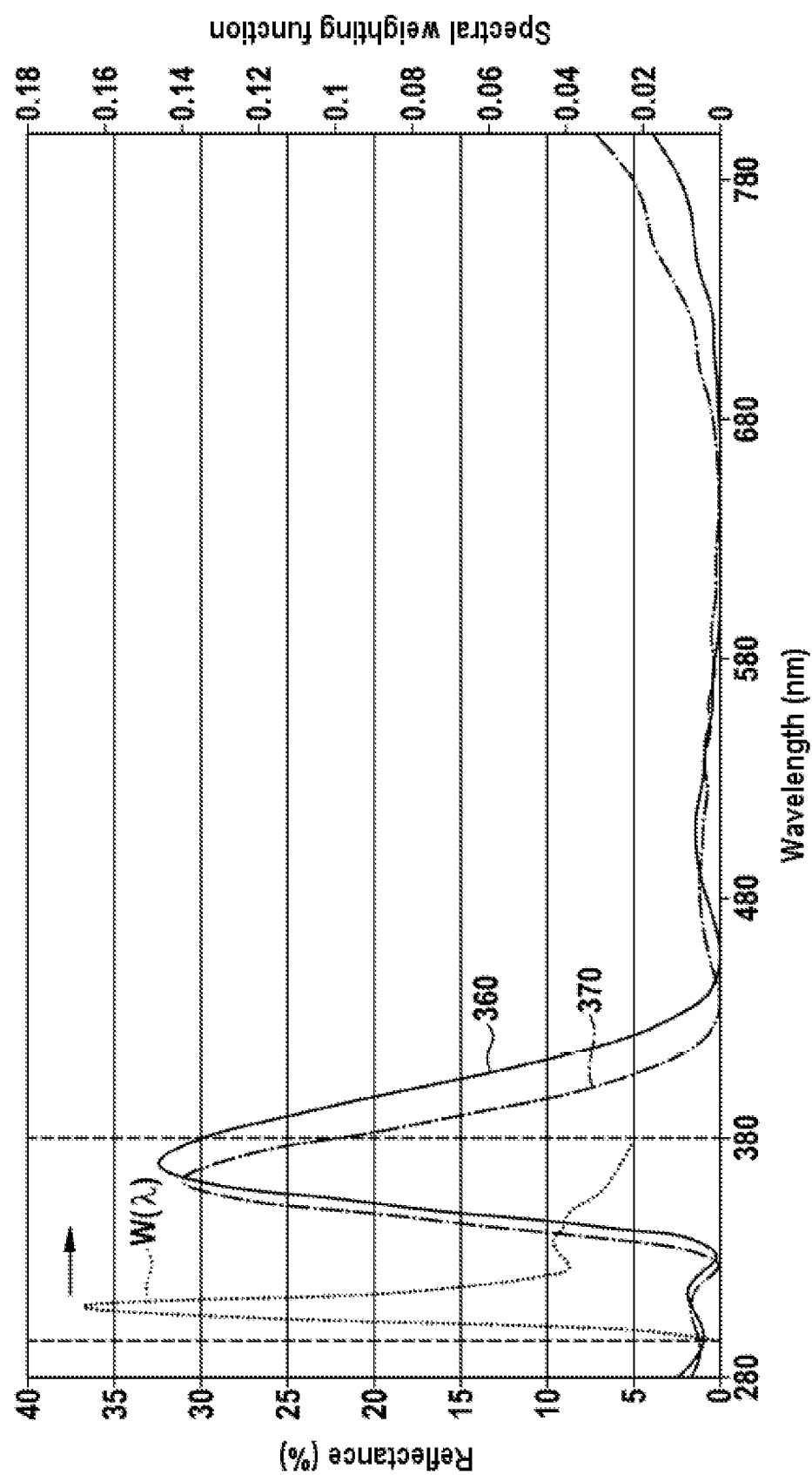
FIG. 7 shows simulated reflection curves of a spectacle lens based on a base material with UV absorber with back-surface coating for different angles of incidence of light on the back surface.

The reflectance for different angles of incidence on the back side of the spectacle lenses is largely independent of the UV absorber content in the base material and illustrated for the angles of incidence 0° (curve 360) and 35° (curve 370) in FIG. 7. FIG. 7 furthermore shows the weighting function W(λ) according to the standard DIN EN ISO 13666:2013-10 to demonstrate the distinction between beneficial and hazardous UV radiation.

To enable the beneficial back-reflection, the reflection at an oblique angle of 35° is above 20% in the case of the present application example for UV wavelengths between 355 nm and 390 nm (can possibly be increased even further with other examples). In the case of a UV-nontransmissive substrate, as a result at least a certain proportion of beneficial UV light can reach the eye. The dotted curve W(λ) indicates which wavelengths are particularly harmful. The latter still have to be suppressed particularly effectively in the reflection. The reflection in this perilous range is 0 to 2%.

The application example described here as back-side antireflection coating for variant 2 has the advantage that the UV protection of the substrate material is not adversely effected since the UV absorber is still admixed without change.

It should be pointed out that in the case of variant 2 further effects can be achieved by way of the front-side coating independent of the back side (e.g., an IR mirror).

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

What is claimed is:

1. A spectacle lens having an object-side front surface and an eye-side back surface, the spectacle lens comprising:
 a base material including an ultraviolet (UV) absorber configured as a band-stop filter to absorb a portion of UV light that is incident on the front surface at an angle of incidence, transmitted through the spectacle lens, and emergent from the back surface of the spectacle lens; and
 an antireflective coating;
  wherein for at least one of a) the UV light that is incident on the front surface with the angle of incidence between 0° and 15°, or, b) the UV light that is incident on the back surface with the angle of incidence between 30° and 45°, the spectacle lens is configured to at least one of:
a) exclude poly allyl diglycol carbonate from the base material,
have a mass fraction of the UV absorber to provide an upper cut-off wavelength of the band-stop filter between 325 nm and 360 nm with a transmittance of 2% of the UV light that is incident on the front surface of the spectacle lens at the angle of incidence, transmitted through the spectacle lens, and emergent from the back surface of the spectacle lens for every angle of incidence between 0° and 15°,
have the transmittance between 25% and 80% at a wavelength of 380 nm of the UV light that is incident on the front surface at the angle of incidence, transmitted through the spectacle lens, and emergent from the back surface of the spectacle lens, for every angle of incidence between 0° and 15°, and
have a reflectance of less than 5% in a wavelength range between 355 nm and 390 nm for the UV light that is incident on the front surface for every angle of incidence between 0° and 15°; or
b) have the reflectance below 5% between 280 nm and a reflectance cut-off wavelength, the reflectance cut-off wavelength being between 325 nm and 350 nm, the reflectance of 5% at the reflectance cut-off wavelength, and the reflectance of greater than 8% at 380 nm, for the UV light that is incident on the back surface for every angle of incidence between 30° and 45°.

2. A spectacle lens having an object-side front surface and an eye-side back surface, the spectacle lens comprising:
a base material having a refractive index of more than 1.50 and including an ultraviolet absorber configured as a band-stop filter to absorb a portion of UV light that is incident on the front surface at an angle of incidence, transmitted through the spectacle lens, and emergent from the back surface of the spectacle lens; and
an antireflective coating;
wherein for at least one of a) the UV light that is incident on the front surface with the angle of incidence between 0° and 15°, or, b) the UV light that is incident on the back surface with the angle of incidence between 30° and 45°, the spectacle lens is configured to at least one of:
a) have a mass fraction of the UV absorber to provide an upper cut-off wavelength of the band-stop filter between 325 nm and 360 nm with a transmittance of 2% of the UV light that is incident on the front surface of the spectacle lens at the angle of incidence, transmitted through the spectacle lens, and emergent from the back surface of the spectacle lens for every angle of incidence between 0° and 15°,
have the transmittance between 25% and 80% at a wavelength of 380 nm of the UV light that is incident on the front surface at the angle of incidence, transmitted through the spectacle lens, and emergent from the back surface of the spectacle lens, for every angle of incidence between 0° and 15°, and
have a reflectance of less than 5% in a wavelength range between 355 nm and 390 nm for the UV light that is incident on the front surface for every angle of incidence between 0° and 15°; or
b) have the reflectance below 5% between 280 nm and a reflectance cut-off wavelength, the reflectance cut-off wavelength being between 325 nm and 350 nm, the reflectance of 5% at the reflectance cut-off wavelength, and the reflectance of greater than 8% at 380 nm, for the UV light that is incident on the back surface for every angle of incidence between 30° and 45°.

3. The spectacle lens as claimed in claim 1, wherein the spectacle lens is configured to have at least one of:
the upper cut-off wavelength of the band-stop filter between 325 nm and 350 nm for the UV light that is incident on the front surface at the angle of incidence, transmitted through the spectacle lens, and emergent from the back surface of the spectacle lens for every angle of incidence between 0° and 15°;
the transmittance of greater than 5% for all wavelengths in a wavelength range between 355 nm and 390 nm of the UV light that is incident on the front surface at the angle of incidence, transmitted through the spectacle lens, and emergent from the back surface of the spectacle lens, for every angle of incidence between 0° and 15°;
the reflectance cut-off wavelength between 325 nm and 340 nm for the UV light that is incident on the back surface at the angle of incidence for every angle of incidence between 30° and 45°; or
the reflectance greater than 6% in the wavelength range between 355 nm and 390 nm for the UV light that is incident on the back surface at the angle of incidence for every angle of incidence between 30° and 45°.

4. The spectacle lens as claimed in claim 1, wherein the spectacle lens is configured to have the upper cut-off wavelength of the band-stop filter between 325 nm and 340 nm for the UV light that is incident on the front surface at the angle of incidence, transmitted through the spectacle lens, and emergent from the back surface of the spectacle lens for every angle of incidence between 0° and 15°.

5. The spectacle lens as claimed in claim 1, wherein the spectacle lens is configured to have the reflectance of less than 5% in a wavelength range between 380 nm and 780 nm for the UV light that is incident on the front surface for every angle of incidence between 0° and 15°.

6. The spectacle lens as claimed in claim 3, wherein the spectacle lens is configured to have the reflectance greater than 2% in the wavelength range between 280 nm and 355 nm for the UV light that is incident on the back surface at the angle of incidence for every angle of incidence between 30° and 45°.

7. The spectacle lens as claimed in claim 1, wherein the spectacle lens is configured to have the transmittance of less than 50% at the wavelength of 380 nm of the UV light that is incident on the front surface at the angle of incidence, transmitted through the spectacle lens, and emergent from the back surface of the spectacle lens, for every angle of incidence between 0° and 15°.

8. The spectacle lens as claimed in claim 7, wherein the spectacle lens is configured to have the reflectance of greater than 5% in the wavelength range between 355 nm and 390 nm for the UV light that is incident on the back surface for every angle of incidence between 30° and 45°.

9. The spectacle lens as claimed in claim 7, wherein the spectacle lens is configured to have the reflectance of less than 5% in the wavelength range between 380 nm and 780 nm for the UV light that is incident on the front surface for every angle of incidence between 0° and 15°.

10. The spectacle lens as claimed in claim 7, wherein the spectacle lens is configured to have the reflectance of less than 5% in the wavelength range between 280 nm and 325 nm for the UV light that is incident on the back surface for every angle of incidence between 30° and 45°.

11. The spectacle lens as claimed in claim 1, wherein the antireflective coating is provided on at least one of the front surface side, the back surface side, or the antireflective coating is embedded into the base material with the UV absorber.

12. A computer program stored on a non-transitory storage medium and having program code for carrying out a method for calculating a spectacle lens with an object-side front surface and an eye-side back surface, a base material including an ultraviolet (UV) absorber configured as a band-stop filter for UV light that is incident on the front surface at an angle of incidence, transmitted through the spectacle lens, and emergent from the back surface, the method comprising:
  providing data representing the base material;
  providing data representing a suitable UV absorber;
  providing data representing a geometry of the front surface of the spectacle lens;
  providing data representing the geometry of the back surface of the spectacle lens;
  providing data representing a mass fraction of the suitable UV absorber in the base material;
  calculating transmittance conditions including:
    calculating a transmittance for light of different wavelengths that is incident on the front surface at different angles of incidence, transmitted through the spectacle lens, and emergent on the back surface of the spectacle lens, based on the data representing the base material, the suitable UV absorber, the geometry of the front surface, the geometry of the back surface, and the mass fraction of the suitable UV absorber,
    calculating an upper cut-off wavelength of the band-stop filter of 2% to be between 325 nm and 360 nm and the transmittance to be between 25% and 80% at 380 nm for light that is incident on the front surface at an angle of incidence, transmitted through the spectacle lens, and emergent from the back surface for every angle of incidence between 0° and 15°,
  varying at least one of the data representing the suitable UV absorber or the mass fraction of the suitable UV absorber; and
  identifying at least one of the suitable UV absorber the mass fraction of the suitable UV absorber for which the transmittance conditions are met; and
  outputting the data representing the suitable UV absorber and the data representing the mass fraction of the suitable UV absorber in the base material for which the transmittance conditions are met,
when the computer program is executed on a computer.

13. A computer program stored on a non-transitory storage medium and having program code for carrying out a method for calculating a spectacle lens with an object-side front surface and an eye-side back surface, a base material including an ultraviolet (UV) absorber configured as a band-stop filter for UV light that is incident on the front surface at an angle of incidence, transmitted through the spectacle lens, and emergent from the back surface, and an antireflective coating arranged on the back surface, the method comprising:
  providing data representing the base material including the UV absorber;
  providing data representing a geometry of the back surface of the spectacle lens;
  providing data representing the antireflective coating having one or a plurality of layers;
  calculating reflectance conditions including:
    calculating a reflectance to be below 5% between 280 nm and a reflectance cut-off wavelength, the reflectance cut-off wavelength being between 325 nm and 350 nm, the reflectance to be 5% at the reflectance cut-off wavelength, and the reflectance to be greater than 8% between 355 nm and 390 nm for the UV light that is incident on the back surface for every angle of incidence between 30° and 45°; and
  outputting the data representing the antireflective coating for which the reflectance conditions are met,
when the computer program is executed on a computer.

14. The method as claimed in claim 13, wherein the coating has the plurality of dielectric layers, and wherein the data representing the antireflective coating comprise a refractive index and a thicknesses of each dielectric layer from among the plurality of dielectric layers.

15. A method for producing a spectacle lens comprising:
  outputting the data representing the suitable UV absorber and the data representing the mass fraction of the suitable UV absorber in the base material for which the transmittance conditions are met as claimed in claim 12.

16. A method of controlling exposure of an eye of an adolescent with a myopia progression to UV light, the method comprising:
  providing the spectacle lens as claimed in claim 1; and
  performing at least one of transmitting a portion of the UV light through the spectacle lens into the eye of the adolescent or reflecting the portion of the UV light off of the back surface of the spectacle into the eye of the adolescent to control a longitudinal growth of the eye of the adolescents.

17. A method for controlling a longitudinal growth of an eye of an adolescent with a myopia progression, the method comprising:
  producing a spectacle lens based on the data representing the suitable UV absorber and the data representing the mass fraction of the suitable UV absorber in the base material for which the transmittance conditions are met as claimed in claim 12, wherein the spectacle lens has a shape to bring about a prescribed optical correction for the myopia; and
  wearing spectacles having the spectacle lens.

18. A method for producing a spectacle lens comprising:
  outputting the data representing the antireflective coating as claimed in claim 13.

* * * * *